US011235185B1

(12) United States Patent
Truesdell (10) Patent No.: US 11,235,185 B1
(45) Date of Patent: Feb. 1, 2022

(54) PROXIMITY LANYARD SYSTEM (71) Applicant: Buckingham Manufacturing Company, Inc., Binghamton, NY (US)

(72) Inventor: Kevin Truesdell, Binghamton, NY (US)

(73) Assignee: Buckingham Manufacturing Company, Inc., Binghamton, NY (US)

(*) Notice: Subject to any disclaimer, the term of this patent is extended or adjusted under 35 U.S.C. 154(b) by 220 days.

(21) Appl. No.: 16/059,568

(22) Filed: Aug. 9, 2018

Related U.S. Application Data (60) Provisional application No. 62/542,885, filed on Aug. 9, 2017.

(51) Int. Cl.
*A62B 35/00* (2006.01)
*G01V 3/08* (2006.01)

(52) U.S. Cl.
CPC ...... *A62B 35/0075* (2013.01); *A62B 35/0037* (2013.01); *A62B 35/0068* (2013.01); *G01V 3/081* (2013.01)

(58) Field of Classification Search
CPC ............ A62B 35/0037; A62B 35/0068; A62B 35/0075; B60R 2022/4816
See application file for complete search history.

(56) References Cited

U.S. PATENT DOCUMENTS

| 3,147,819 | A | * | 9/1964 | Keleher | .................. B60R 22/48 180/270 |
| 6,006,860 | A | * | 12/1999 | Bell | ....................... A62B 35/04 182/18 |
| 6,330,931 | B1 | | 12/2001 | Baillargeon et al. | |
| 6,572,148 | B2 | * | 6/2003 | Wittenberg | ............. B60R 22/12 180/268 |
| 8,675,823 | B2 | | 3/2014 | Hooten | |
| 8,902,074 | B2 | * | 12/2014 | Landry | ................ G08B 25/016 182/3 |
| 9,174,072 | B2 | * | 11/2015 | Strasser | ............. A62B 35/0087 |
| 9,650,016 | B2 | * | 5/2017 | Andreen | ............ G06K 9/00832 |
| 9,847,010 | B2 | * | 12/2017 | Pham | ...................... G08B 21/18 |
| 9,861,840 | B2 | * | 1/2018 | Moore, Jr | .......... A62B 35/0075 |
| 10,138,102 | B2 | | 11/2018 | Baillargeon et al. | |
| 10,457,208 | B1 | * | 10/2019 | Motta | .................... B60N 2/002 |
| 10,562,491 | B2 | * | 2/2020 | Morgantini | ............ B60N 2/002 |
| 10,828,517 | B2 | * | 11/2020 | Bhaskarwar | ....... A62B 35/0075 |
| 2007/0182534 | A1 | * | 8/2007 | Gregory | .................. B60R 22/48 340/457.1 |

(Continued)

OTHER PUBLICATIONS

Canadian Office Action dated Aug. 27, 2019.

*Primary Examiner* — Colleen M Chavchavadze
(74) *Attorney, Agent, or Firm* — Bond, Schoeneck & King, PLLC; Frederick Price (57) ABSTRACT

A system and method for detecting securement of a proximity lanyard system to a bucket anchor in a bucket having a proximity sensor positioned therein. The proximity lanyard system can include an elongated body portion having a first end and a second end; a harness attachment positioned at the first end of the body portion; an anchor attachment positioned at the second end of the body portion; and a sensor substrate section comprising a sensor substrate and being integrated with the second end of the flexible body portion. The proximity sensor can detect the sensor substrate when the anchor attachment is connected to the bucket anchor.

7 Claims, 9 Drawing Sheets

(56) References Cited

U.S. PATENT DOCUMENTS

| | | | | |
|---|---|---|---|---|
| 2008/0106413 | A1* | 5/2008 | Rohlf | G09F 3/14 |
| | | | | 340/572.1 |
| 2010/0231402 | A1* | 9/2010 | Flynt | G08B 19/00 |
| | | | | 340/679 |
| 2015/0145666 | A1* | 5/2015 | Sugawara | B60R 22/48 |
| | | | | 340/457.1 |
| 2017/0193799 | A1* | 7/2017 | Holub | A62B 35/0006 |
| 2017/0326429 | A1* | 11/2017 | Strasser | A63B 24/0087 |
| 2018/0086303 | A1* | 3/2018 | McCoy | B60R 22/023 |
| 2018/0208318 | A1* | 7/2018 | Brunaux | B60R 22/12 |
| 2018/0357879 | A1* | 12/2018 | Negre | A62B 35/0025 |
| 2019/0135228 | A1* | 5/2019 | Haymond | B60R 22/48 |
| 2020/0047006 | A1* | 2/2020 | Blackford | F03G 5/04 |
| 2020/0101330 | A1* | 4/2020 | Blackford | A62B 1/06 |

* cited by examiner

PROXIMITY LANYARD SYSTEM

CROSS-REFERENCE TO RELATED APPLICATIONS

This application claims priority to U.S. Provisional Patent Application Ser. No. 62/542,885, filed on Aug. 9, 2017 and entitled "Lanyard Proximity System," the entirety of which are incorporated herein by reference.

BACKGROUND OF THE INVENTION

1. Field of the Invention

The present invention relates to a method and a system for proximity sensing and, more specifically, to a method and system for a lanyard attachment for use, for instance, in sensing proximity of a lanyard in relation to a sensor near a bucket anchor.

2. Description of the Related Art

Conventionally, one end of a lanyard is secured to an anchor or "D" ring in a bucket on a conventional bucket truck, while the other end is secured to a worker (via a harness or otherwise) positioned in the bucket. A bucket sensor is positioned/attached to the bucket in close proximity to the "D" ring. The clip or connector portion of the lanyard, comprising some area of metal, is outfitted with magnets (positioned on the outside of the clip via epoxy or other adhesive). The bucket sensor can detect the magnets on the connector portion, and can therefore determine (or an attached computer system can determine based on information provided by the sensor) if the lanyard is in close proximity to the bucket sensor (and, thus, the worker is safely attached to the bucket "D" ring).

However, as recognized and appreciated by the inventors, the lanyard with magnets adhesively attached to the clip have many limitations including, but not limited to the following: the magnets can easily be removed or can fall off due to weakening of the adhesive over time; the magnets are exposed to deleterious environmental elements; and the magnets must be placed on the relatively small metal clip, which can be cumbersome, may obstruct operation of the clip, and may impart a weaker seal in view of a small surface area to position the adhesive.

BRIEF SUMMARY OF THE INVENTION

It is therefore a principal object and advantage of the present invention to provide a method and system for a lanyard attachment that eliminates one or more of the problems/issues with conventional lanyard devices described above.

The system can include a lanyard with one or more sensor substrates (e.g., magnets) internally positioned or integrated therein. The sensor substrates are configured to be detected/sensed by particular sensors, when the sensor substrate is in a certain proximity to the sensor (the positions and locations of the sensor substrate and related sensors as described herein can be varied, and can be switched, as long as the functionality of the described proximity sensing can be accomplished by a particular configuration of a sensor and its related sensor substrate). For example, a magnet, as a sensor substrate, is configured to emit a magnetic field that is designed to be used and operate in conjunction with a preinstalled sensor near a bucket anchor, e.g., Recon Dynamics sensor and Recon Dynamics Aerial Harness Training System, as should be understood by those of ordinary skill in the art in conjunction with a review of this disclosure. If a controller of the bucket portion of a bucket truck activates/lifts the bucket without a lanyard with one or more magnets internally positioned or integrated therein connected to the anchor, an alarm will sound or an otherwise electronic notice will be transmitted from the sensor (which can be equipped with a computer microprocessor with enabling firmware/software) to the bucket truck driver or other user/authority (by wired or wireless means, as should be understood by those of skill in the art in conjunction with a review of this disclosure). Thus, the sensor is configured to detect the presence and/or absence of the magnets internally positioned within or otherwise integrated with the lanyard, and provide or send a notification regarding such presence (e.g., local or remote audible or visual notification such as a green light indicator in the truck or at a remote location, or other notification via smart phone etc.) or absence (e.g., local or remote audible or visual notification such as a red light indicator in the truck or at a remote location, an audible alarm, or other notification via smart phone etc.), as should be understood by a person of ordinary skill in the art in conjunction with a review of this disclosure. Alternatively, a sensor substrate is not required to emit a sensing field (e/g/, a magnetic field). A sensor substrate can be composed of a material or otherwise configured to be sensed by a sensor when in a particular location.

In a preferred embodiment, the lanyard includes an elongated body with a first end and a second end, an anchor attachment/connector portion positioned at the first end and a harness attachment positioned at the second end. The anchor attachment can have a metal or other clip for securing the lanyard around an anchor (e.g., a "D" ring, a bar or other point of attachment as should be understood by those of skill in the art in conjunction with a review of this disclosure) in or near the bucket, while the harness attachment can have a hitch loop or other connector portion to attach to a harness of a user. A sensor substrate such as a magnet can be sewn, woven, or otherwise fixed within fabric material at one or more of the following locations: the anchor attachment, the harness attachment, and/or other part or portion of the lanyard, based on use of the lanyard, positioning of an anchor and/or sensor. Alternative embodiments are contemplated wherein the number (in addition to the placement) of the sensor substrates within the lanyard/anchor attachment/harness attachment varies. In addition, other sensing mechanisms (as an alternative to magnets and related magnet sensors, to be used for the same purposes in the same manner as described herein, as should be understood by those of ordinary skill in the art in conjunction with a review of this disclosure) are contemplated including the use of RFID sensor and tags, pressure, inductive, photoelectric or infrared sensors.

In some embodiments, the magnets are integral with and/or incorporated within the composite material of the lanyard and/or the lanyard/anchor attachment/harness attachment. In other embodiments, the magnets are first stitched or otherwise fixed within a fabric material that is then attached to the lanyard. In another embodiment, the material containing the magnet loops through an aperture in a clip or D-ring (or other connector) before it is secured to the lanyard. In that case, the material containing the magnet simultaneously secures the magnet and connects the clip (or other connector) to the lanyard.

In the embodiment where the magnet is integral with the fabric of the lanyard or material connecting the clip to the lanyard, the magnet does not interfere with the functioning of the clip. Further, the magnet can be permanently secured within the lanyard, thus the magnet can be protected from environmental elements and from dislodging from the device. The fabric, webbing, or other like material encasing the magnet can also protect the magnet from tampering and abuse. This ensures that the proximity alarm feature is working properly and notifies users of any potential for harm. Finally, as the magnet can be incorporated in the material of the lanyard or the material attaching a lanyard to a connector, the lanyard attachment system can be incorporated into a wide variety of lanyards, connectors, and configurations and combinations thereof.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects and steps of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
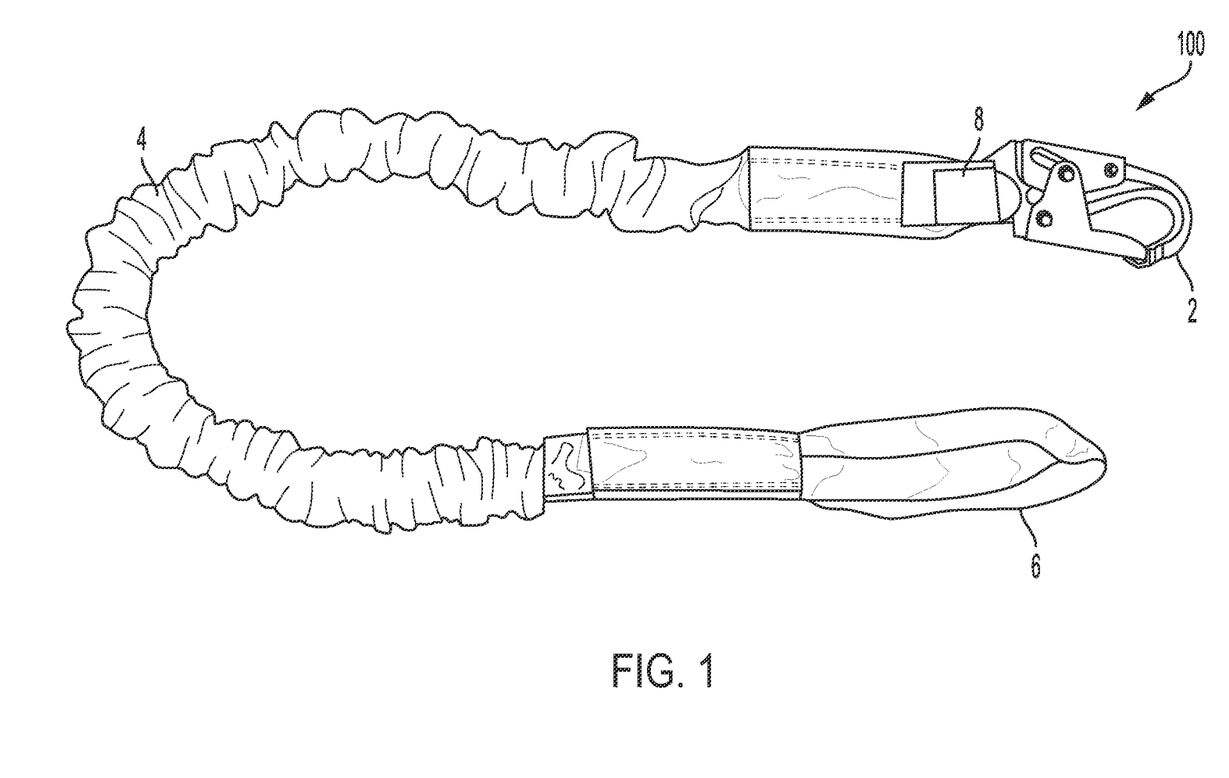
FIG. 1 is a perspective view representation of a proximity lanyard system, according to an embodiment.

Referring to FIG. 1, a perspective view of a proximity lanyard system 100 is shown according to an embodiment. The proximity lanyard system 100 can be configured to meet ANSI Z359.13 and ASTM F887 requirements, as should be understood by a person of ordinary skill in the art in conjunction with a review of this disclosure. An embodiment of the proximity lanyard system 100 can be deemed an "energy absorbing" lanyard. For example, current ANSI Z359.13 limits the force on a user in a 6' free fall to under a 900 lbf. average, or in a 12 ft. free fall to under 1,350 lbf. This is currently required by ANSI and OSHA regulations. An embodiment of the proximity lanyard system 100 can absorb the energy of the fall by using special materials (e.g. fibers) that tear away or separate at a specified load (as should be understood by a person of ordinary skill in the art in conjunction with a review of this disclosure) to prevent the force on a user from exceeding the above referenced force limits.

Still referring to FIG. 1, the proximity lanyard system 100 can include, but is not limited to, an elongated flexible body portion 4 having a first end and a second end, a harness attachment 6 positioned at the first end of the flexible body portion 4, an anchor attachment 2 (with a movable/openable (biased closed) snap or carabiner end) positioned at the second end of the flexible body portion 4, and a sensor substrate section 8 integrated with the second end of the flexible body portion 4. The body 4 can be fixed in length. Alternatively, body 4 can be configured to elongate/stretch/extend from a first length (e.g., 4'-8') to a second longer length (e.g. from 3-4.5' to 5-7'). The harness attachment 6, which can include a hitch loop (as shown) or other connector such as a clip, is configured to be attached (e.g., girth hitched) to a harness worn by a user. The harness can include an ANSI/ASTM rated harness with web loop or a dielectric dorsal attachment, for example (as should be understood by a person of skill in the art in conjunction with a review of this disclosure).

Figure 2A:
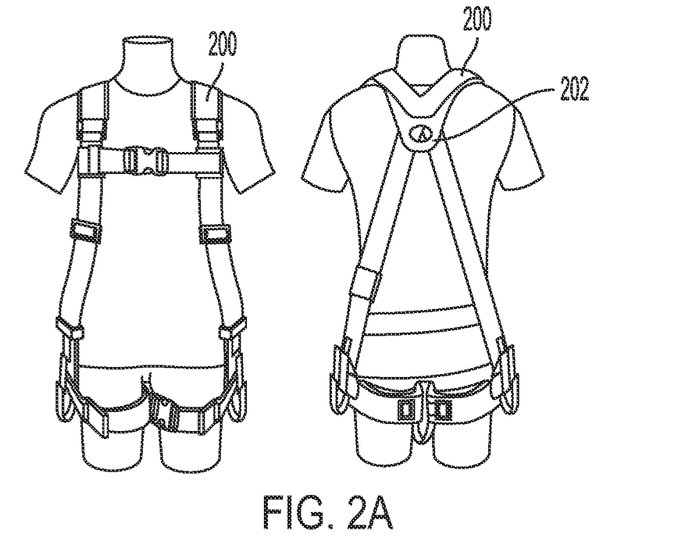
FIG. 2A shows front and back perspective view representations of a harness, which is configured to be used with an embodiment of the present invention.
Figure 2B:
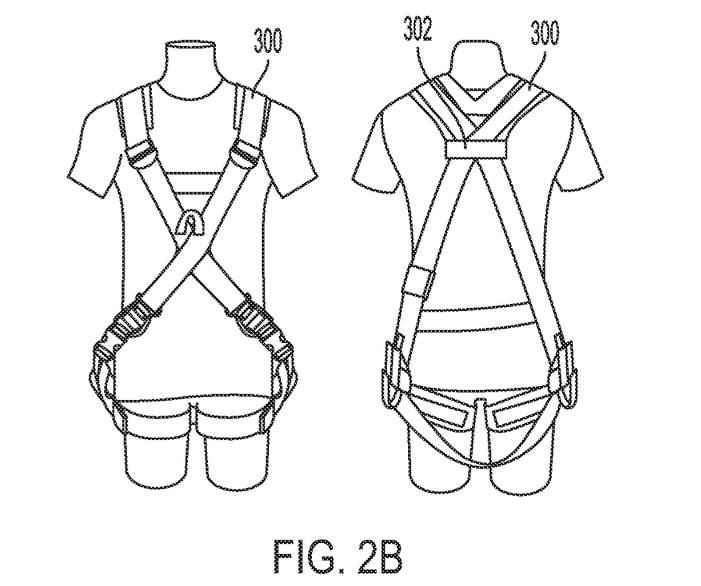
FIG. 2B shows front and back perspective view representations of a harness, which is configured to be used with an embodiment of the present invention.
Figure 2C:
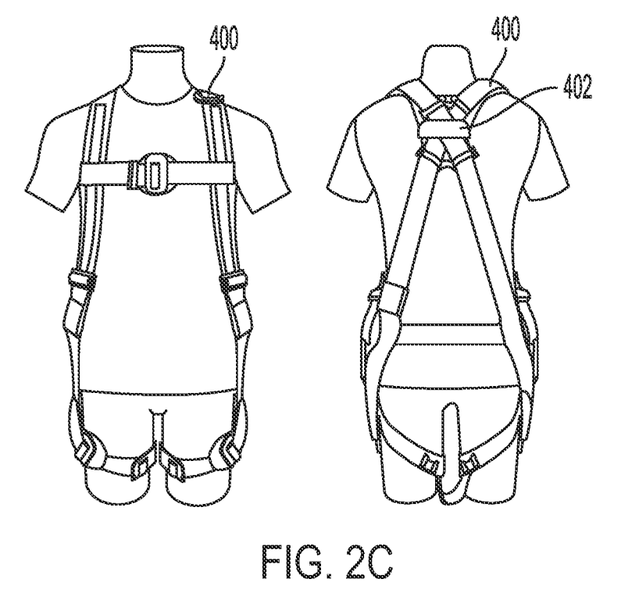
FIG. 2C shows front and back perspective view representations of a harness, which is configured to be used with an embodiment of the present invention.
Figure 2D:
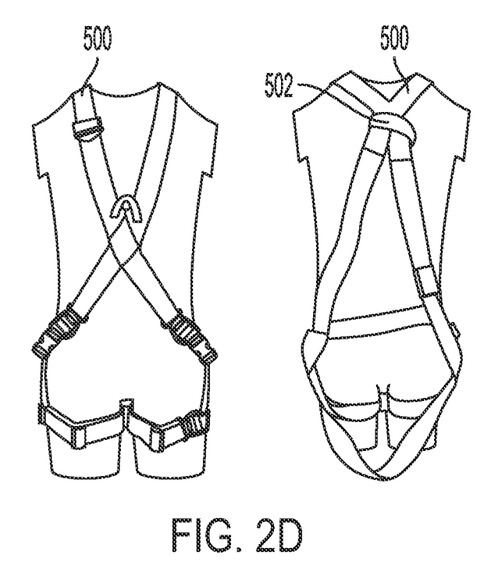
FIG. 2D shows front and back perspective view representations of a harness, which is configured to be used with an embodiment of the present invention.

Perspective views of example harnesses are shown in FIGS. 2A-D. FIG. 2A shows front and back views of a BuckOhm™ H-Style harness 200 with dielectric hardware and built in suspension trauma straps, according to an embodiment. FIG. 2B shows front and back views of a BuckOhm™ X-Style harness 300 with dielectric hardware, web dorsal loop and built in suspension trauma straps, according to an embodiment. FIG. 2C shows front and back views of an H-Style full body harness 400, according to an embodiment. FIG. 2D shows front and back views of an X-Style full body harness 500, according to an embodiment. The harness attachment 6 of the proximity lanyard system 100 can attach to a dorsal attachment point (202, 302, 402 and 502, respectively) as shown in FIGS. 2A-D. The dorsal attachment point can be a D-ring, web loop, pigtail extension or other connection point.

Figure 3A:
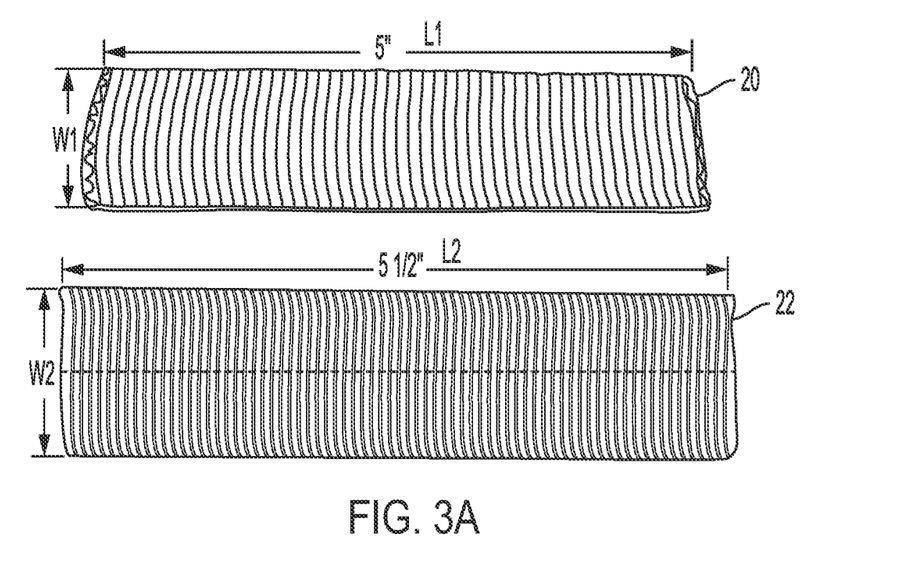
FIG. 3A is a perspective view representation of a portion of a proximity lanyard system, according to an embodiment.
Figure 3B:
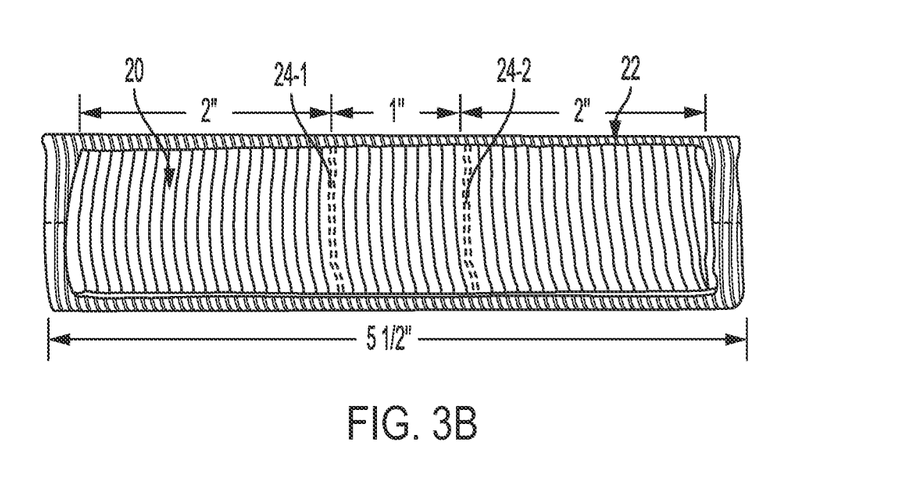
FIG. 3B is a perspective view representation of a portion of a proximity lanyard system, according to an embodiment.

FIGS. 3A-4C illustrate the formation and configuration of integrated sensor substrate section 8. Turning to FIG. 3A, perspective views of fabric tubing 20 of a first length L1 and first width W1, and fabric tubing 22 of a second longer length L2 and second longer width W2 are shown. The tubing may be constructed of nylon, polyester, aramid or similar fibers. The ends of each fabric tubing 20, 22 can be heat sealed to prevent fraying. FIG. 3B is a perspective view of fabric tubing 20 placed over fabric tubing 22. Fabric tubing 20 is preferably substantially centered over fabric tubing 22, and at least one line of stitching is made across the width of fabric tubing 20, 22 (preferably two lines of stitching 24-1 and 24-2, equidistant from the end, as shown in FIG. 3B—2 inches from each end leaving one inch of fabric between the stitches).

Figure 3C:
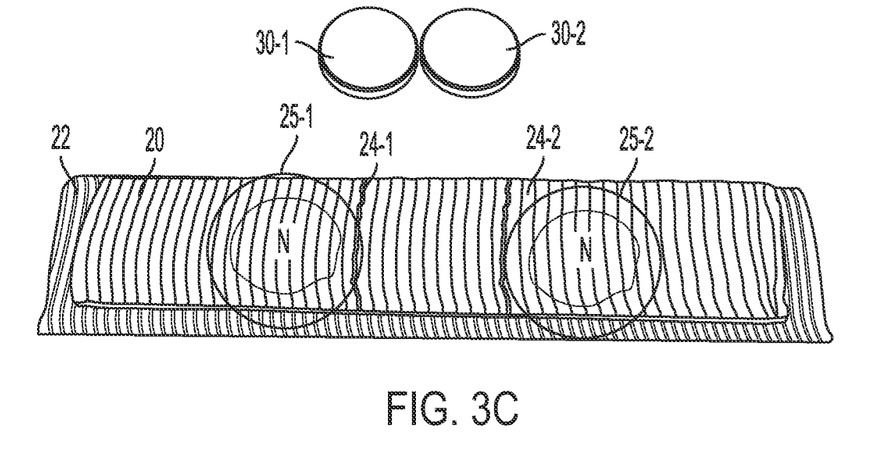
FIG. 3C is a perspective view representation of a portion of a proximity lanyard system, according to an embodiment.

Referring to FIG. 3C, two disc magnets 30-1 and 30-2 are shown, and represent the sensor substrate in this example (which could be a single magnet or other sensor substrate, described above). The magnets 30-1 and 30-2, as a sensor substrate of an embodiment of the present invention, are formed and configured to emit a magnetic field of sufficient strength and radius to be detected/sensed by a sensor in a bucket of a bucket truck to indicate that it is attached (when attached) to an anchor within the bucket (as further described below). Example particulars of the two example magnets can include, but are not limited to, those shown in Table 1, below.

TABLE 1

Dimensions: 3/4" dia. × 1/8" thick
Tolerances: ±0.004" × ±0.004"
Material: NdFeB, Grade N52
Plating/Coating: Ni-Cu-Ni (Nickel)
Magnetization Direction: Axial (Poles on Fat Ends)
Weight: 0.239 oz. (6.79 g)
Pull Force, Case 1: 12.08 lbs
Pull Force, Case 2: 44.57 lbs
Surface Field: 2340 Gauss
Max Operating Temp: 176° F. (80° C.)
Brmax: 14,800 Gauss
BHmax: 52 MGOe Still referring to FIG. 3C, the magnets 30-1 and 30-2 are place in pockets or partially made pockets/receiving sections 25-1 and 25-2, respectively, formed by the stitching between fabric tubing 20 and fabric tubing 22. As shown, a particular pole (north pole) of the magnet is facing away from fabric tubing 22 and toward fabric tubing 20. Alternatively, the south pole of the magnet can face away from fabric tubing 22 and toward fabric tubing 20.

Figure 3D:
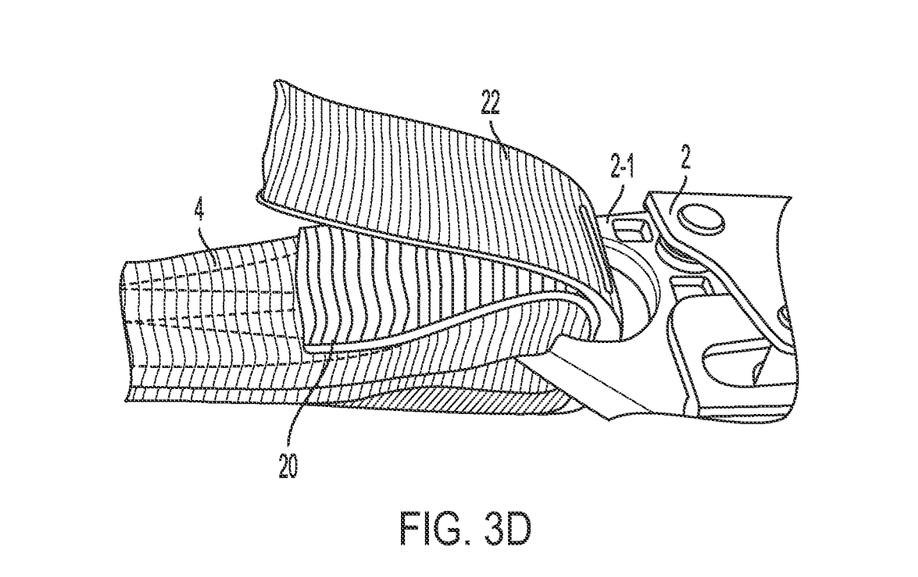
FIG. 3D is a perspective view representation of a portion of a proximity lanyard system, according to an embodiment.
Figure 3E:
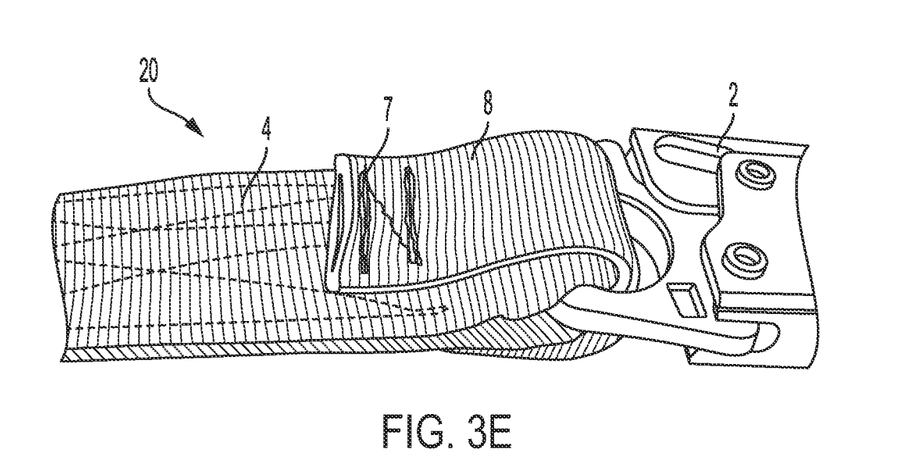
FIG. 3E is a perspective view representation of a portion of a proximity lanyard system, according to an embodiment.
Figure 3F:
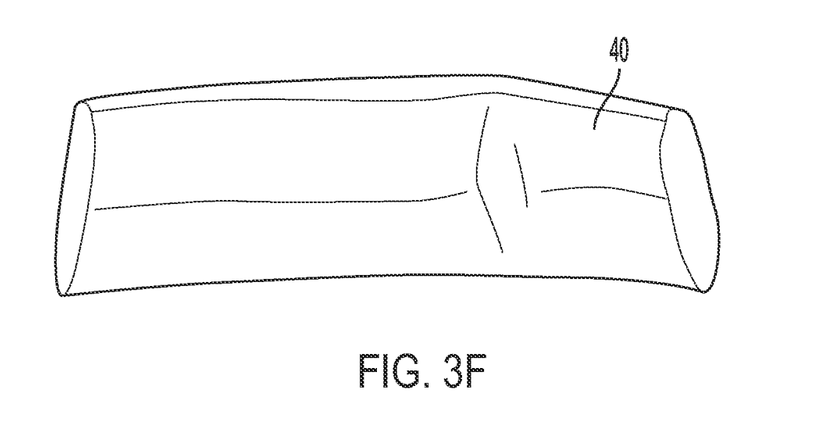
FIG. 3F is a perspective view representation of a portion of a proximity lanyard system, according to an embodiment.

Turning to FIGS. 3D-F, perspective view of the final steps of the formation of the integrated sensor substrate section 8, and each of the flexible body 4 and the integrated sensor substrate section 8 attached to the anchor attachment 2. In particular, the flexible body 4 is positioned through a D-ring portion 2-1 of the anchor attachment 2, and then the fabric tubing 20 and fabric tubing 22 construct is positioned through the D-ring portion 2-1 of the anchor attachment 2 and stitched together at the ends to form the integrated sensor substrate section 8 (before or after being positioned through the D-ring portion 2-1 of the anchor attachment 2). In an alternative embodiment, the fabric tubing 20 and fabric tubing 22 construct does not need to be stitched together at the ends to form the integrated sensor substrate section 8. The fabric tubing 20 and fabric tubing 22 construct can then be further connected to the flexible body 4 per further stitching or adhesive, and/or a shrink tube 40 (FIG. 3F) can be placed at least partially over the fabric tubing 20 and fabric tubing 22 construct and adjacent portion of the flexible body 4.

Figure 4A:
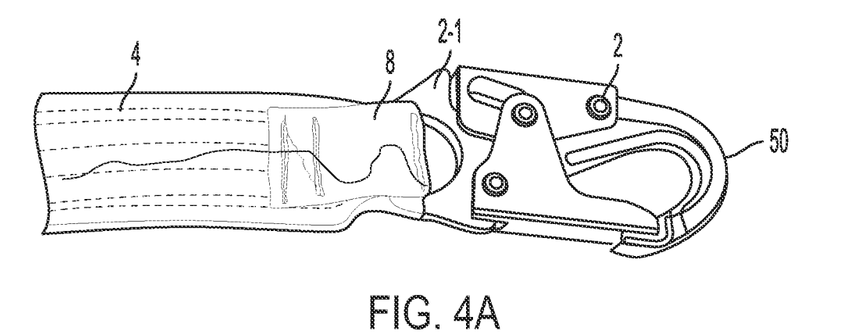
FIG. 4A is a perspective view representation of a portion of a proximity lanyard system, according to an embodiment.
Figure 4B:
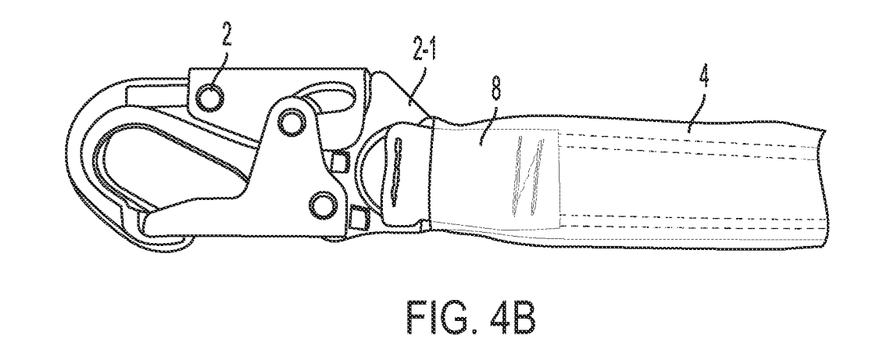
FIG. 4B is a perspective view representation of a portion of a proximity lanyard system, according to an embodiment.
Figure 4C:
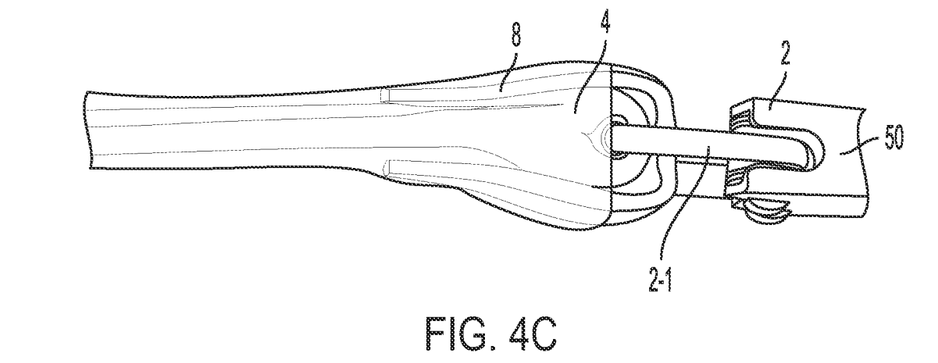
FIG. 4C is a perspective view representation of a portion of a proximity lanyard system, according to an embodiment.

Referring to FIGS. 4A-C, various perspective view of the anchor attachment 2 of the fully formed proximity lanyard system 100 is shown, according to an embodiment. A portion of the flexible body 4 and fully formed integrated sensor substrate section 8 are shown positioned through D-ring 2-1 of the anchor attachment 2 over which the clear shrink tube 40 is positioned. As noted in this particular embodiment, the south pole of each magnet is facing outward away from the longitudinal axis 50 of the proximity lanyard system 100. In this configuration, the polarities of the magnets are aligned to generate a magnetic field sufficient to encapsulate the connection point(s) on the proximity end of the lanyard (e.g., anchor attachment 2). Alternatively, the north pole of each magnet can face outward away from the longitudinal axis 50 of the proximity lanyard system 100. Further, other configurations are contemplated. For example, one magnet can face outward and away from the longitudinal axis 50 of the proximity lanyard system 100, and another or additional magnet(s) can face the same, different and/or opposite directions.

Figure 5A:
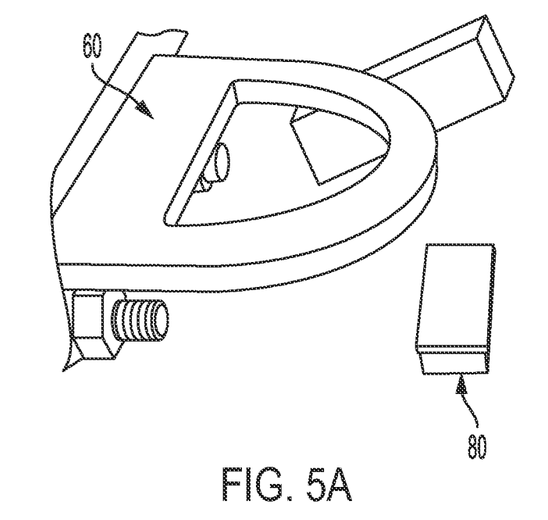
FIG. 5A is a close-up perspective view representation of a bucket anchor with a bucket sensor, which is configured to be used with an embodiment of the present invention.
Figure 5B:
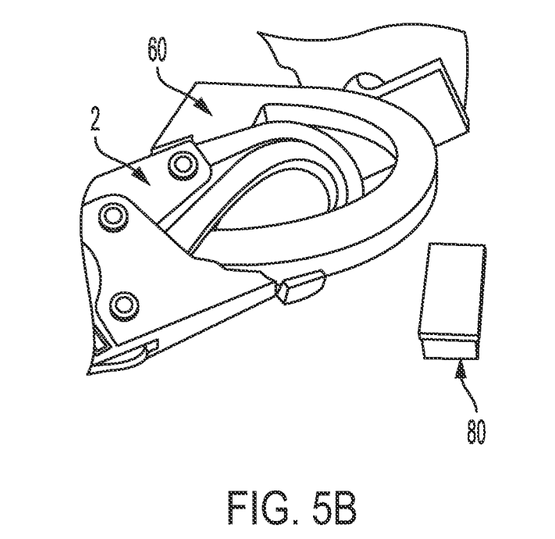
FIG. 5B is a close-up perspective view representation of a bucket anchor with a bucket sensor and an anchor attachment of the proximity lanyard system attached to the bucket anchor, according to an embodiment.

Referring to FIG. 5A, a close-up perspective view of a bucket anchor 60 is shown with a bucket sensor 80 (e.g., Recon Dynamics sensor) positioned in a bucket of a bucket truck (not shown). The bucket sensor 80 is configured and/or programmed to detect/sense a particular sensor substrate positioned within a predetermined proximity sensing radius. FIG. 5B is a close-up perspective view of the anchor attachment 2 of the fully formed proximity lanyard system 100 clipped to the bucket anchor 60. This positioning of the anchor attachment 2 with the integrated sensor substrate section 8 (not shown) clipped to the bucket anchor 60 is within the predetermined proximity sensing radius to indicate to the sensor that the anchor attachment 2 is actually attached to the bucket anchor 60.

Figure 6:
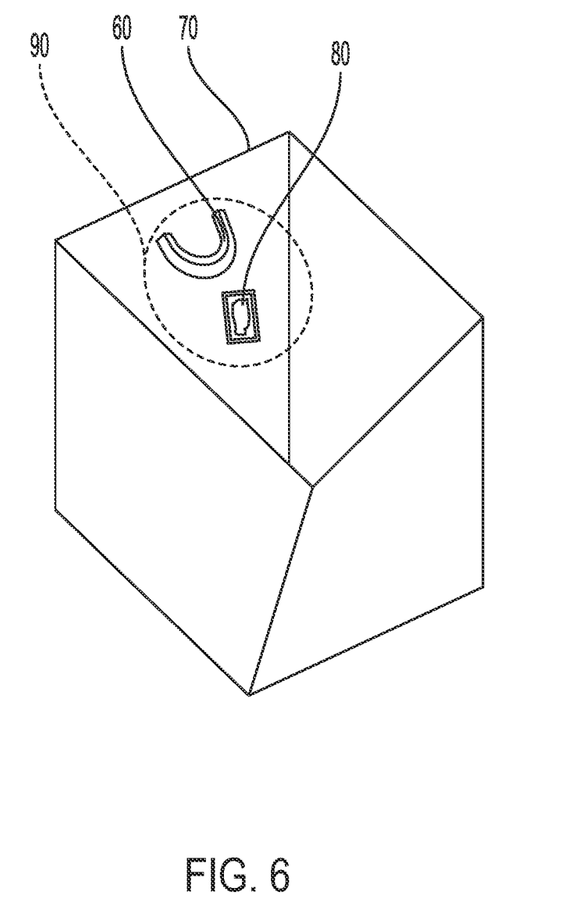
FIG. 6 is a perspective view schematic representation of a bucket with a bucket anchor and a bucket sensor, which is configured to be used with an embodiment of the present invention.

Referring to FIG. 6, a perspective view schematic representation of a bucket 70 is shown. The bucket 70 includes a bucket anchor 60, and a bucket sensor 80 with a predetermined sensing radius 90. The predetermined sensing radius 90 is close enough the bucket anchor 60 to be configured to detect/sense an integrated sensor substrate section 8 of a proximity lanyard system 100 (not shown) clipped to the bucket anchor 60, and to provide the required notices to indicate attachment or no attachment of the proximity lanyard system 100.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A proximity lanyard system comprising:
    an elongated, flexible body portion having a first end and a second end;
    a harness attachment positioned at the first end of the body portion;
    an anchor attachment positioned at the second end of the body portion; and
    a first magnet and a second magnet wherein the first magnet and the second magnet are disposed adjacent to opposing sides of the flexible body portion, each magnet having a first pole and a second pole, wherein the first pole of the first magnet and the first pole of the second magnet each face away from the elongated, flexible body portion, the first magnet and the second magnet each being positioned to together generate a magnetic field sufficient to encapsulate the second end of the flexible body portion, wherein the flexible body portion includes a flexible receiving section having the first magnet and the second magnet positioned therein.

2. The system of claim 1, wherein the first pole is a south pole.

3. The system of claim 1, wherein the first pole is a north pole.

4. The system of claim 1, wherein the flexible receiving section is composed of fabric and the first magnet and the second magnet is sewn therein.

5. The system of claim 1, wherein the second end of the elongated body portion is positioned through a D-ring portion of the anchor attachment.

6. The system of claim 1, wherein the flexible receiving section is positioned through a D-ring portion of the anchor attachment.

7. The system of claim 1, wherein the elongated body portion is configured to extend from a first length to a second length, wherein the second length is longer than the first length.

* * * * *